Patented Aug. 7, 1951

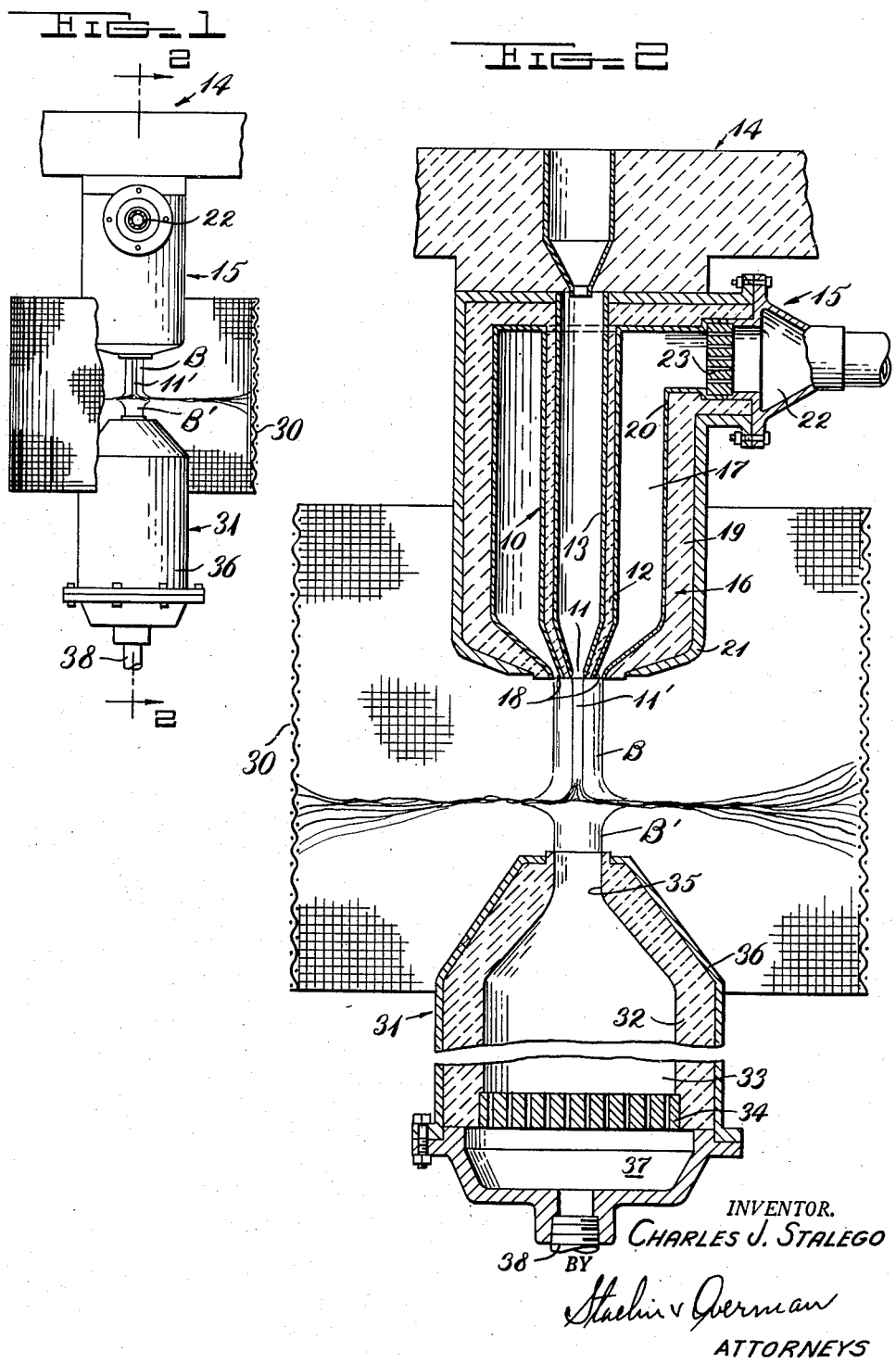

2,563,080

UNITED STATES PATENT OFFICE 2,563,080

METHOD AND APPARATUS FOR PRODUCING GLASS FIBERS

Charles J. Stalego, Newark, Ohio, assignor to Owens-Corning Fiberglas Corporation, a corporation of Delaware Application August 6, 1947, Serial No. 766,777

20 Claims. (Cl. 18—2.5)

This invention relates to an improved method and apparatus for making fibers from thermoplastic or heat-softenable materials, for example, as glass.

One of the objects of this invention is to provide a process rendering it possible to produce a large quantity of fibers in a minimum length of time by relatively simple and inexpensive apparatus. In accordance with this invention it is possible to produce on an economical production basis fibrous mats relatively free from "shot" or "beads." Mats or fibers capable of being produced by this invention my be employed in the manufacture of insulation bats, insulation board, blankets for both thermal and acoustic insulation, and many other products.

Another object of this invention is to feed an elongated body of heat-softenable material into an intensely hot, high-velocity gaseous blast and to subsequently deflect the gases generally radially outwardly with such force that the material is shredded or broken up into fine fibers.

Still another object of this invention is to feed an elongated body of heat-softenable material such as glass into one of two intensely hot, high-velocity blasts arranged in opposed relationship so that one blast impinges against the end of the other blast with such force that the material is shredded and directed generally radially outwardly by the force of the gases fanning out from the zone of collision of the blasts.

A more detailed object of this invention is to produce fibers from a molten stream of thermoplastic or heat-softenable material such, for example, as glass with opposed gaseous blasts produced by the products of combustion discharged from opposed combustion-type burners. More particularly, the burners embody spaced confined chambers in which a combustible gaseous mixture is burned and have outlet openings through which the products of combustion are discharged in the form of gaseous blasts. The openings face one another so that the blasts impinge against one another and are restricted to not only accelerate the rate of flow of the gaseous blasts but to also provide a temperature in the blasts which exceeds the softening temperature of the material. Actually the velocity of the gaseous blasts is so high that the gases fanned out as a result of collision of the blasts apply sufficient force to the shredded material to draw the latter out into fibers.

A further object of this invention is to envelop the stream of molten material from its source with the gases of one blast so that the stream is not only attenuated by the force of the blast but is also maintained at the proper temperature or viscosity to enable effectively breaking up the stream when the blast impinges against the opposing blast. Thus, a stream of substantial size may be employed with the result that a large quantity of fibers may be produced in a given length of time by a single apparatus.

A still further object of this invention is to produce the stream from a supply body of molten glass or other thermoplastic material surrounded by the combustion chamber of one of the burners so that the heat generated in the chamber assists in maintaining the supply body in a molten state. In fact, this feature renders it possible to proportion the parts so that glass batch may actually be melted in the glass retaining chamber by the heat produced in the combustion chamber.

The foregoing as well as other objects will be made more apparent as this description proceeds, especially when considered in connection with the accompanying drawing, wherein:

Figure 1 is a fragmentary side elevational view of one type of apparatus capable of economically carrying out the steps of the process; and Figure 2 is a sectional view of the construction shown in Figure 1.

The process embodying the features of this invention will be more fully understood by reference to the novel apparatus illustrated herein for carrying out the various steps of the process. In detail, the apparatus comprises an elongated vertically supported chamber 10 adapted to contain a supply of molten glass and having an outlet opening 11 at the lower end through which the glass flows in the form of a stream 11'. The walls 12 of the chamber are lined with a material 13 such, for example, as platinum, molybdenum or some other material capable of withstanding extremely high temperatures over long periods of use. The chamber 10 is open at the top for communication with a forehearth or glass feeder 14.

The reference character 15 indicates a gas combustion-type burner having a wall 16 surrounding the chamber 10 and cooperating with the walls of the chamber 10 to form a confined combustion space or chamber 17 having an outlet opening 18 at the lower end concentrically arranged with respect to the outlet opening 11 in the glass retaining chamber 10. The combustion chamber wall is shown in Figure 2 of the drawing as comprising a relatively thick refractory section 19 lined at the inner side with a high temperature refractory 20 and enclosed in a metal case 21. The metal case 21 is provided with a gas inlet opening 22 at the upper end of the combustion chamber 17 and the latter communicates with the inlet opening 22 through the usual perforated wall 23.

As the gaseous mixture to be burned enters the combustion chamber 17 through the orifices in the perforated wall 23 it is ignited and burns with a resulting high degree of expansion. As the burning of the gaseous mixture in the chamber 17 continues, the temperature of the walls 12 and 16 rises substantially with the result that the rate of burning of the incoming gaseous mixture is not only accelerated but the molten glass in the chamber 19 is heated or maintained at the proper viscosity to assure flowing of the molten glass through the outlet opening 11 in the form of a stream. The resulting high rate of combustion causes a great expansion of the products of combustion and the latter passes through the outlet opening 18 in the form of an intensely hot high velocity blast B.

In accordance with this invention the cross sectional area of the outlet opening 18 is so proportioned with respect to the cross sectional area of the combustion chamber 17 that the products of combustion are discharged from the opening 18 at a temperature in excess of the softening temperature of the glass and at a velocity sufficient to draw out or attenuate the stream of molten glass issuing from the outlet opening 11. By carefully proportioning the effective cross sectional area of the outlet opening 18 with respect to the cross sectional area of the combustion chamber 17 it is possible to obtain a gaseous blast having a temperature as high or higher than 3000° F. and having a velocity as high or higher than 1200 feet per second which, of course, is many times greater than the rate of flame propagation of the combustible gaseous mixture in the atmosphere. In practice, the cross sectional area of the outlet opening 18 may be varied to some extent relative to the cross sectional area of the combustion chamber 17, depending upon the heat required in the blast leaving the outlet opening 18. Outlet openings of greater cross sectional area relative to the cross sectional area of the combustion chamber 17 permit burning a greater amount of gas and result in generating greater heat in the blast, but also cause a decrease in the velocity of the blast. Preferably, however, the cross sectional area of the outlet opening 18 is no greater than necessary to obtain in the blast the heat required to raise the glass to the desired attenuating temperature.

The type of combustible gas used may be of any suitable kind, but for reasons of economy, it is preferably an ordinary fuel gas, such as natural or manufactured fuel gas. This gas is mixed with the proper amount of air by means of the orthodox air and gas mixers. The gas and air mixture is taken from the mixer at moderate pressure of approximately one to five pounds per square inch, but may be considerably higher if desired, and is fed through an ordinary conduit to the combustion chamber 17 where ignition of the gaseous mixture takes place. In general, the aim is to feed as much gaseous mixture into the chamber 17 as possible without causing the combustion to become unstable or to take place at the outside of the chamber, or to cease altogether.

Owing to the fact that the combustible gaseous mixture is burned in direct heat conducting relation to the wall 12 of the chamber 10, it is possible to actually melt glass marbles or some glass producing batch in the chamber 10. In cases where it is desired to actually melt glass or glass batch in the chamber 10, the latter together with the associated combustion chamber are preferably lengthened to provide ample time for heating the glass to the temperature required to assure obtaining molten glass of the proper viscosity at the outlet opening 11.

Regardless of whether molten glass is introduced into the chamber 10 or whether glass or a glass forming batch is melted in the chamber 10, molten glass is discharged through the outlet opening in the form of a stream 11' enveloped by the gaseous blast issuing from the burner outlet opening 18. As stated above, the characteristics of the blast are such that the stream of glass is maintained at the proper viscosity by the temperature of the blast to enable drawing out or attenuating the stream by the force of the blast.

As the stream 11' of molten or heat softened glass is projected into the atmosphere by the blast B the latter is interrupted by a second gaseous blast B' directed toward the blast B in a manner to cause the blasts to impinge against one another. The second blast B' is also moving at a high velocity and the impact of the two blasts causes the gases to fan outwardly. As the direction of flow of the two gaseous blasts is suddenly changed by the collision of the two blasts, the stream of glass is shredded or broken up and the glass is, in effect, attenuated in a multiplicity of directions extending generally radially outwardly with respect to the blasts to form fibers. The fibers thus formed are collected on an annular screen 30 and may be removed from the screen in any suitable manner.

The second blast B' is produced by a gas combustion-type burner 31 having a body 32 of refractory material and having a combustion chamber 33. One end of the combusion chamber 33 terminates at a perforated wall 34 having a multiplicity of small orifices therethrough and the opposite end of the chamber 33 is formed with a restricted outlet opening 35 which is preferably, although not necessarily, circular in cross section. The refractory body is surrounded by a suitable casing or shell 36 having an extension forming an inlet chamber 37 between the perforated wall 34 and adjacent end of the shell. A suitable conduit 38 is connected to the shell in a position to enable the combustible gaseous mixture to be supplied to the inlet chamber 37. The type of combustible gas employed in the burner 31 may be of any suitable kind, but for reasons of economy it is preferred to use the same type of gas employed in the burner 15. In any case, the gas selected is mixed with the proper amount of air by a suitable mixer (not shown) prior to being conveyed to the inlet chamber 37 so that as the mixture passes through the orifices in the perforated wall it is ignited and burns with a resulting high degree of expansion.

The principle of operation of the burner 31 is similar to the principle of operation of the burner 15 and, therefore, need not again be described in detail. It will suffice to bring out that the cross sectional area of the outlet opening 35 is reduced to such an extent with respect to the cross sectional area of the combustion space 33 that the products of combustion are discharged in the form of an intensely hot, high velocity blast B'. The temperature of the gaseous blast B' is preferably sufficiently high to avoid cooling of the molten glass in the stream 11' and the velocity of the blast may be equal to or somewhat less than the velocity of the blast B.

The second burner 31 is supported in any suitable manner in spaced relation to the first burner 15 with the outlet opening 35 located directly opposite the outlet opening 18 of the first burner so that the two blasts impinge against one another at a point between the burners. The actual spacing between the burners may vary considerably depending to some extent on the characteristics of the blasts and for the purpose of this illustration the two burners may be considered as spaced between 3 to 8 inches apart.

Due to the high velocity of the two blasts the latter meet with considerable force and the gases making up the blasts are, accordingly, directed generally radially outwardly toward the circular collecting screen 30 at a substantial rate of speed. It will be seen that as the gases change direction they shred or virtually tear the molten glass stream 11' in a multiplicity of directions extending generally radially with respect to the normal course of travel of the stream and the force applied by the radially moving gases attenuate the molten glass into fibers which eventually deposit on the screen 30. The tearing or shredding action of the gases is so violent that glass streams having a mean diameter of one-quarter of an inch or more may be employed with the result that a very large quantity of fibers may be produced in a given length of time with a single apparatus.

I claim:

1. The process of making fibers from a heat-softenable material which comprises feeding an elongated body of the material along a predetermined path, enveloping the body of material with a gaseous blast having a temperature in excess of the softening temperature of the material and moving at a velocity sufficient to draw out the body of material in the direction of flow of the blast, intercepting the blast with an opposing gaseous blast to deflect the gases generally radially outwardly in a multiplicity of directions and causing the heat-softened material to shred and travel outwardly in said directions in the form of fibers by the force of the outwardly moving gases.

2. The process of making glass fibers which comprises producing a high velocity gaseous blast of intense heat, feeding a stream of molten glass into the blast and causing the stream to flow in the direction of the blast by the force of the latter, directing a second high velocity blast in the opposite direction against the end of the first blast to deflect the gases laterally outwardly in a multiplicity of directions to shred the glass and propel the shredded glass in said directions by the force of the outwardly moving gases.

3. The process of making glass fibers which comprises feeding a stream of molten glass along a predetermined path of travel, enveloping the stream with a gaseous blast having a temperature in excess of the softening temperature of the glass and moving at a velocity sufficiently high to draw out the stream in the direction of flow of the blast, impinging a second high velocity blast of intense heat against the end of the first blast to deflect the gases generally radially outwardly in a multiplicity of directions and causing the molten glass to shred and travel outwardly in said directions by the force of the deflected gases.

4. The process of making glass fibers which comprises flowing a stream of glass from a supply body of glass, burning a combustible gaseous mixture in heat conducting relation to the supply body and discharging the products of combustion in the form of a blast enveloping the stream of molten glass, directing a second gaseous blast in the opposite direction against the end of the first blast to deflect the gaseous blast laterally outwardly in a multiplicity of directions to shred the glass and propel the shredded glass in said directions by the force of the deflected gases.

5. The process of making glass fibers which comprises flowing a stream of glass from a supply body of glass, burning a combustible gaseous mixture in a confined chamber surrounding the supply body to heat the latter, discharging the products of combustion from the chamber through a restricted port surrounding the stream of glass to envelop the stream in a gaseous blast having a temperature exceeding the softening temperature of the glass and having a velocity sufficiently high to draw out the stream of glass, interrupting the gaseous blast to fan out the gases by impinging the end of the blast with a second high temperature blast flowing in the plane of said first blast and causing the glass to shred and travel outwardly in a multiplicity of directions by the force of the deflected gases.

6. The process of making glass fibers which comprises flowing a stream of glass from a supply body of glass, burning a combustible gaseous mixture in a confined chamber surrounding the supply body to heat the latter, discharging the products of combustion from the chamber through a restricted port surrounding the stream of glass to envelop the stream in a gaseous blast having a temperature exceeding the softening temperature of the glass and having a velocity sufficiently high to draw out the stream of glass, impinging a second intensely hot high velocity gaseous blast in a direction opposed to said first blast against the end of the first blast to deflect the gases outwardly in a multiplicity of directions, and causing the molten glass to shred and pass outwardly in said directions by the force of the deflected gases.

7. Apparatus for producing fibers from a heat-softenable material, comprising means for producing an intensely hot high velocity blast, means for feeding an elongated body of heat softenable material into the blast, and means for discharging a second blast in the opposite direction in the path of travel of the first blast for deflecting the gases and material in a multiplicity of directions extending laterally outwardly from the path of travel aforesaid.

8. Apparatus for producing fibers from a heat-softenable material, comprising means for producing a gaseous blast having a temperature in excess of the softening temperature of the material and having a velocity sufficient to draw out the softened material, means for introducing an elongated body of the material into the blast, and means for directing a second gaseous blast in a direction generally opposite to that of the first blast against the leading end of the first blast with sufficient force to deflect the gases and heat-softened material laterally outwardly in a multiplicity of directions.

9. Apparatus for producing fibers from a heat-softenable material, comprising means for flowing a stream of the material along a predeterminated path, means for enveloping the stream in a gaseous blast having a temperature in excess of the softening temperature of the material and having a velocity sufficiently high to draw out the softened material, and means for impinging a second gaseous blast traveling in the opposite direction against the leading end of the first blast with sufficient force to fan out the gases and heat-softened material.

10. Apparatus for producing fibers from a heat-softenable material, comprising a pair of spaced chambers in which a combustible gaseous mixture is burned and having discharge ports located directly opposite one another through which the products of combustion are discharged in the form of blasts, and means for feeding an elongated body of heat-softenable material into one of the blasts.

11. Apparatus for producing fibers from a heat-softenable material, comprising a pair of spaced confined chambers in which a combustible gaseous mixture is burned and having outlet openings located directly opposite each other, said outlet openings being restricted to discharge the products of combustion in the form of blasts having sufficient velocity to fan out with considerable force upon contact, and means for feeding an elongated body of the material into one of the blasts adjacent the outlet opening producing the latter blast.

12. Apparatus for producing glass fibers, comprising a chamber adapted to contain a supply of molten glass and having an outlet opening through which the glass flows in the form of a stream, means for burning a combustible gaseous mixture in heat conducting relation to the chamber and for discharging the products of combustion in the form of a blast enveloping the stream of glass, and means for impinging a second gaseous blast traveling in the opposite direction against the leading end of the first blast to deflect the gases and molten glass laterally outwardly in a multiplicity of directions.

13. Apparatus for producing glass fibers, comprising a chamber adapted to contain a supply of molten glass and having an outlet opening through which the glass flows in the form of a stream, a burner having a wall surrounding the chamber and cooperating with the latter to form a confined space in which a combustible gaseous mixture is burned, an outlet opening for the burner surrounding the stream and through which the products of combustion are discharged in the form of a blast having a temperature in excess of the softening temperature of the glass and having a velocity sufficiently high to draw out the stream of glass, and a second burner having a chamber in which a combustible gaseous mixture is burned and having an outlet opening located directly opposite the outlet opening of the first burner in spaced relation thereto for discharging the products of combustion against the leading end of the blast issuing from the first burner to fan out the gases and molten glass in a multiplicity of directions.

14. The process of making fibers from a heat-softenable material which comprises producing a high velocity gaseous blast of intense heat, feeding an elongated body of heat-softenable material into the blast, deflecting the gases making up the blast and the heat-softenable material carried by the blast in a multiplicity of directions extending substantially normal to the direction of flow of the blast by obstructing the flow of the blast at a point spaced from its origin and before said fibers are formed with a blast flowing in a generally opposite direction, and drawing out the deflected heat softened material into fibers by the velocity of the blast components moving in the different directions aforesaid.

15. The process of making glass fibers which comprises producing a plurality of high velocity blasts of gas of intense heat, directing the blasts in opposite directions toward one another so that the blasts impinge one another with such force that gas components of the blasts are deflected outwardly from the zone of impingement of the blasts at substantial velocity, feeding an elongated body of glass in the direction of one of the blasts and into said one blast at a point adjacent the origin of the latter blast, moving the glass introduced into said one blast into said zone by the velocity of the gases making up said one blast, and drawing out the glass introduced into the zone in a multiplicity of directions extending outwardly from said zone by the heat and force of the gas components.

16. The process of making fibers from a heat-softenable material which comprises producing a plurality of high velocity blasts of gas of intense heat, directing the blasts in opposite directions toward one another in a manner such that the advancing ends of the blasts impinge one another with such force that gas components of the blasts are deflected outwardly from the zone of impingement of the blasts at substantial velocity, feeding an elongated body of heat-softenable material into the zone aforesaid, and drawing out the heat softened material in a multiplicity of directions extending outwardly from said zone by the heat and force of the gas components.

17. The process of making glass fibers which comprises burning a combustible mixture of gases within a chamber and discharging the burned gases from the chamber as a blast moving at substantial velocity and having a temperature exceeding the softening temperature of glass, feeding a body of glass into the blast, deflecting the gases making up the blast and the softened glass within the blast in a multiplicity of directions extending substantially radially with respect to and transverse of the direction of flow of the blast by obstructing the flow of the blast at a plane spaced from the chamber and transversely related to the direction of flow of the blast and while the blast is above said softening temperature, and drawing out the deflected softened glass into fibers by the velocity of the deflected components of the blast.

18. The process of making glass fibers which comprises burning a combustible mixture of gases within a chamber and discharging the burned gases through an outlet opening in one wall of the chamber in the form of a high velocity intensely hot blast, feeding a body of glass through the outlet opening into the blast, deflecting the burned gases making up the blast and the glass within said blast laterally outwardly from the blast in a multitude of directions by engaging the blast with a second blast flowing in the opposite direction, and drawing out the deflected glass into fibers by the velocity of the components of the blast moving in said directions.

19. The process of making glass fibers which comprises burning a combustible mixture of gases within spaced substantially axially aligned chambers, restricting the discharge of the burned gases from the chambers to provide blasts moving at substantial velocity and having a temperature exceeding the softening temperature of glass, directing the blasts toward one another and causing the blasts to impinge against each other from generally opposite directions with such force that components of the blasts are deflected generally radially outwardly at high velocity, feeding glass into the zone of impingement of the blasts, and shredding and drawing out the glass into fibers by the deflected components of the blasts.

20. The process of making glass fibers which comprises burning a combustible mixture of gases within spaced chambers, restricting the discharge of the burned gases from the chambers to provide blasts moving at substantial velocity and having a temperature exceeding the softening temperature of glass, feeding glass into one of the blasts and drawing out the glass in the direction of movement of said one blast, directing the blasts toward one another and causing the blasts to collide between the chambers with such force that the glass and components of the blasts are deflected outwardly in a multitude of directions, and drawing out the deflected glass into fibers by the deflected components of the blasts.

CHARLES J. STALEGO.

REFERENCES CITED

The following references are of record in the file of this patent:

UNITED STATES PATENTS

| Number | Name | Date |
| --- | --- | --- |
| 1,328,446 | Odam | Jan. 20, 1920 |
| 2,018,478 | Whittier | Oct. 22, 1935 |
| 2,126,411 | Powell | Aug. 9, 1938 |
| 2,365,970 | Pearce | Dec. 26, 1944 |
| 2,450,363 | Slayter | Sept. 28, 1948 |
| 2,489,242 | Slayter et al. | Nov. 22, 1949 |